United States Patent [19]

Ensinger

[11] 4,374,399
[45] Feb. 15, 1983

[54] INSERTION OF NON-SYNCHRONOUS DATA INTO VERTICAL INTERVAL

[75] Inventor: James W. Ensinger, Roselle, Ill.

[73] Assignee: Zenith Radio Corporation, Glenview, Ill.

[21] Appl. No.: 292,453

[22] Filed: Aug. 13, 1981

[51] Int. Cl.³ .............................................. H04N 7/04
[52] U.S. Cl. .................................................... 358/147
[58] Field of Search ................................ 358/147–149

[56] References Cited

U.S. PATENT DOCUMENTS 3,996,583 12/1976 Hutt et al. ........................... 358/147

Primary Examiner—John C. Martin

[57] ABSTRACT

A head-end facility is provided for encoding selected data into the vertical intervals of one or more received television signals in a manner so as to avoid conflicts with the simultaneous re-broadcasting of the encoded signals. The selected data is generated at the head-end facility in the form of a plurality of pairs of duplicate data packets whose corresponding portions are separated in time by one-half field of a standard television signal. A plurality of channel registers are successively updated by being loaded with one of the duplicate data packets of each pair, the loaded duplicate data packets being non-coincident in time with the vertical intervals of the received television signal intended to be re-broadcast over the respective channel. The contents of the channel registers are successively read and inserted into the vertical intervals of the television signals of the respective channels.

16 Claims, 3 Drawing Figures

INSERTION OF NON-SYNCHRONOUS DATA INTO VERTICAL INTERVAL

BACKGROUND OF THE INVENTION

The present invention relates generally to methods and apparatus for encoding data into the vertical intervals of a plurality of television signals. The invention more particularly relates to methods and apparatus for encoding data into the vertical intervals of a plurality of simultaneously transmitted subscription or cable television signals, the vertical intervals of the various television signals typically occurring in an unsynchronized manner.

The vertical intervals of television signals are finding increased use as a medium for transmitting various types of data. For example, teletext and captioning-for-the-deaf data is normally transmitted during selected horizontal lines of the vertical interval of a broadcast television signal. Also, the vertical interval of a broadcast television signal which has been scrambled to limit access thereto is frequently used to transmit appropriate instructions for enabling an authorized receiver to unscramble the signal.

In one known system, selected data is encoded in the vertical intervals of a plurality of television signals by a facility located intermediate the actual sources of the signals and the signal reproducing television receivers. Thus, in a cable television (CATV) or subscription television (STV) system, the head-end facility typically receives a plurality of television signals from various sources, e.g. satellite broadcasts, encodes selected data into the vertical intervals of the received television signals and then simultaneously re-broadcasts the encoded television signals over multiple television channels. In a system of this general type, the vertical intervals of the television signals received by the head-end facility are normally not synchronized in time so that precautions must be taken to avoid conflicts between the encoding and re-broadcasting operations. That is, in order to prevent data loss or degradation, the head-end facility must be operated such that, for each channel, a vertical interval used to re-broadcast encoded data is not at the same time being updated with new data.

Prior art techniques for accomplishing the foregoing typically utilize some sort of double buffering arrangement. In such arrangements, each channel includes an output register supplied by an intermediate buffer register which is in turn supplied by a common computer. Selected data is transferred from the computer to each buffer register at the television signal field rate and stored therein until the contents of the associated output register have been read during a vertical interval of the television signal transmitted by the respective channel. At this time, the data stored in the buffer register is transferred to the output register while the buffer register is updated with new data from the computer. The contents of the output register are again encoded into the subsequently occuring vertical interval of the television signal after which the output register is again updated from the buffer register and the buffer register from the computer. As explained previously, this double buffering arrangement is necessary in order to prevent data loss/degradation which could otherwise result by encoding a vertical interval of the television signal with data from the output register while, at the same time, attempting to update the output register with new data. The fact that the vertical intervals of the television signals received by the head-end facility occur in an unsynchronized and unpredictable manner make the need for data transfer characteristics such as exhibited by the double buffering arrangement even more important.

While the double buffering arrangement described above generally provides satisfactory results, the expense and complexity of the overall system are considered to be distinct disadvantages thereof. In this regard, although only a single computer is required to initially generate the selected data, a buffer register together with appropriate logic to control the transfer of data from the buffer register to the output register is required for each channel of the system.

It is accordingly a basic object of the present invention to provide improved methods and apparatus for encoding data into the vertical intervals of a plurality of received television signals.

It is a more specific object of the invention to provide improved methods and apparatus for encoding data into the vertical intervals of a plurality of received television signals without any concomitant data loss or degradation.

It is a further object of the invention to provide an implementation of a system of the foregoing type which is relatively inexpensive and non-complex and which does not require the use of intermediate buffer registers.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the several figures and in which:

DESCRIPTION OF THE PREFERRED EMBODIMENT

Figure 1:
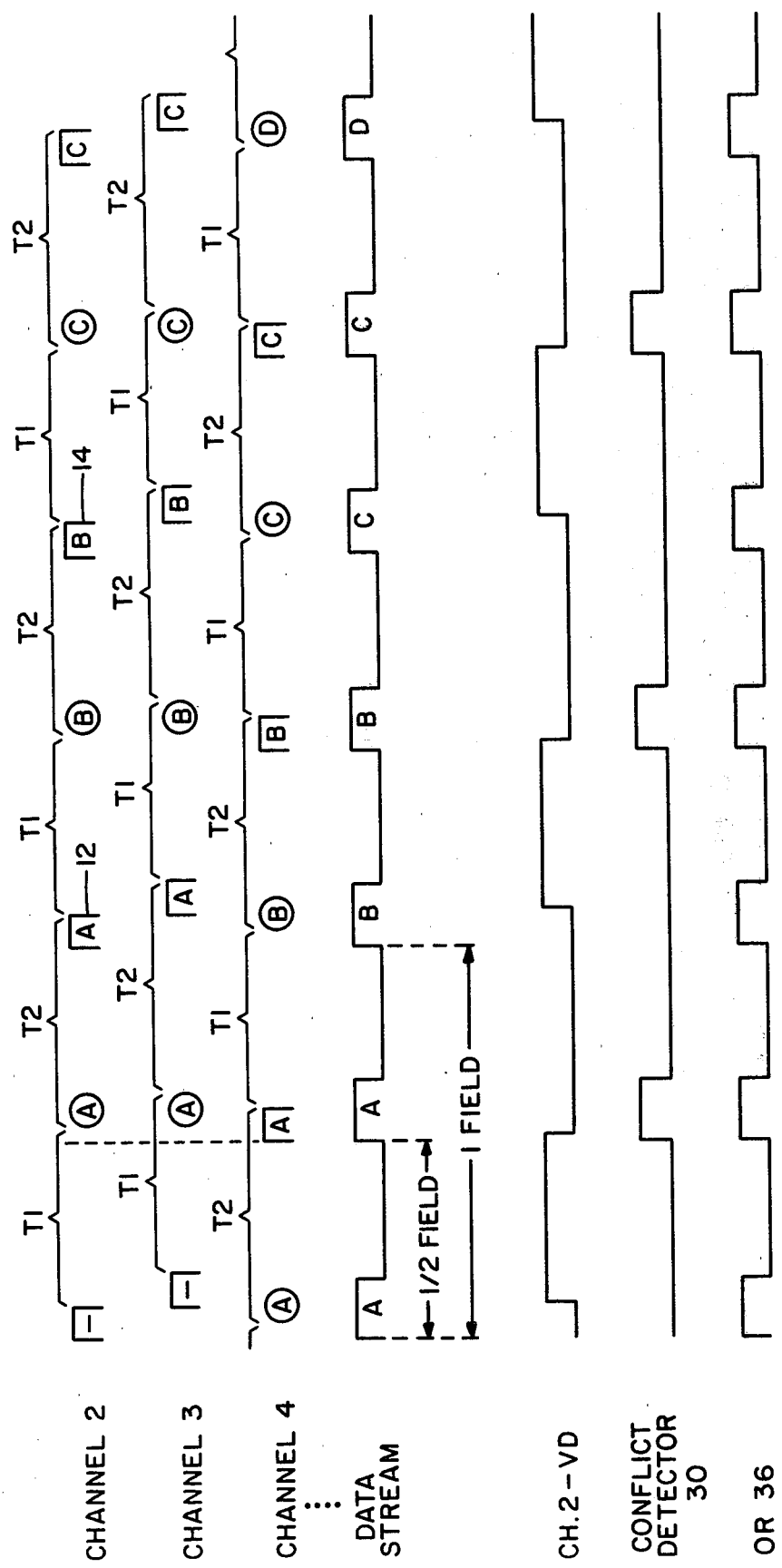
FIG. 1 diagrammatically illustrates the principles of the present invention wherein common data is encoded into the vertical intervals of each of a plurality of television signals.

FIG. 1 diagrammatically illustrates a plurality of television signals each transmitted over a different television channel and received by a signal distribution center such as a cable television (CATV) head-end facility. The various television signals may originate from a number of different sources such as satelite broadcasts and the like. In the diagramatic illustration of FIG. 1, each unclosed rectangle represents the occurrence of a vertical interval of a respective one of the received television signals, successive vertical intervals of each television signal being separated in time by a field of horizontal scanning lines. Since the signal receiving and distribution center has no control over the signal origination sources, the phasing of the vertical intervals of the various received television signals is completely random and non-synchronous. To illustrate this non-synchronous phasing by way of example, it will be observed that the vertical intervals of the television signal received on channel 3 are slightly delayed in time with respect to the vertical intervals of the television signal received on channel 2 while the vertical intervals of the television signal received on channel 4 occur about mid-way between the vertical intervals of channel 2.

Various types of data are typically encoded or inserted into the vertical intervals of the received television signals at the signal distribution center which subsequently re-broadcasts the television signals including the data encoded in the vertical intervals thereof. The data may comprise, for example, teletext, subscriber addressing information, video descrambling codes, etc. The vertical interval data insertion function is normally accomplished through the use of a plurality of output channel registers, each of the registers being associated with a respective one of the channels and having its contents read at the appropriate times for insertion into the vertical intervals of the television signal received over the respective channel. Due to the non-synchronous occurrence of the vertical intervals of the television signals received over the different channels, it will be appreciated that the contents of the different output channel registers are read at different times. Moreover, it will be appreciated that in many instances the data to be inserted into the vertical intervals of the received television signals will be changed on a field by field basis so that the contents of the output channel registers must also be updated on a field by field basis. In order to avoid system conflicts, the register updating operation must be performed only during time intervals when data is not being read from the registers for insertion into the vertical intervals of the television signals. That is, data cannot be written into a particular channel register for updating its contents while, at the same time, data is being read from the register for insertion into the vertical interval of a received television signal.

Conflicts of the foregoing type are avoided according to the present invention by a novel technique wherein the data to be inserted in a vertical interval of one or more received television signals is generated in the form of duplicate data packets at twice the field rate of a standard television signal. In other words, if it is desired to insert a selected data packet into a vertical interval of one or more of the received television signals, the selected data packet is formed as a pair of identical or duplicate data packets, the corresponding portions of which are separated in time by one-half field of a standard television signal. In addition, each field of each received television signal is divided into two contiguous timing intervals, a first timing interval extending from about the half-way point of the field to the end of the preceding vertical interval and a second timing interval extending from about the half-field point to the end of the next occuring vertical interval. As a consequence, each of the first timing intervals defines a time period extending for about one-half field after the occurrence of a vertical interval of the respective television signal and thereby extending for about one-half field after the contents of the respective channel register have been read. Thus, if the beginning of a duplicate data packet coincides with a first timing interval, it can safely be assumed that data can be written into the respective channel register without causing a conflict since at least one-half field must transpire before the next vertical interval occurs and the contents of the register are read. Furthermore, due to the spacing of the duplicate data packets, it is assured that the beginning of at least one of each pair of duplicate data packets coincides with each first timing interval such that no data transmission losses can occur.

Referring most specifically to FIG. 1, there is illustrated three television signals received by the distribution center over channels 2, 3 and 4. There is also shown a data stream generated according to the invention at the distribution center for insertion into the vertical intervals of the received television signals. Each field of each received television signal is divided into a first timing interval T1 and a second timing interval T2 as described above.

Referring initially to the channel 2 television signal, it will be observed that the beginning or leading edge of the second duplicate data packet A coincides with the initial first timing interval T1. As a consequence, the second duplicate data packet A is transferred for updating the contents of the channel 2 output register as represented by the encircled A in the television signal waveform. Thereafter, the contents of the channel 2 register are read during the next occurring vertical interval 12 for insertion therein (as represented by the letter A within vertical interval 12). At the same time, a first duplicate data packet B is generated by the data stream but, since the beginning or leading edge of this data packet coincides with a timing interval T2, the data is not read into the channel 2 register at this time thereby avoiding any conflict between the operations of reading data from and writing data into the register. A second duplicate data packet B is generated by the data stream one-half field later and, since the leading edge of this data packet coincides with a first timing interval T1, the data represented thereby is transferred for updating the channel 2 register as represented by the encircled B. The second duplicate data packet B stored in the register is subsequently read for insertion into the next vertical interval 14. The foregoing process is continuously repeated whereby each second duplicate data packet is used to update the channel 2 register whose contents are read for insertion into the next vertical interval.

An identical procedure is used to insert the data packets into the vertical intervals of the television signal received on channel 3. It will be noticed that since the vertical intervals of the channel 3 signal are slightly delayed with respect to the vertical intervals of the channel 2 signal, the timing intervals T1 and T2 are correspondingly delayed. However, the leading edge of each second duplicate data packet still coincides with a timing interval T1 while the leading edge of each first duplicate data packet coincides with a timing interval T2. Therefore, as in the case of the channel 2 television signal, each second duplicate data packet is used to update the contents of the channel 3 output register whose contents are subsequently read for insertion into the next occurring vertical interval.

The phase of the vertical intervals of the television signal received on channel 4 is substantially different from the phase of the channel 2 and 3 signals. Nevertheless, it will be observed that the channel 4 output register is successively updated on a field by field basis and data read therefrom during the vertical intervals of the received television signal without any conflict. In particular, in this case the leading edge of each first duplicate data packet coincides with a timing interval T1 while the leading edge of each second duplicate data packet coincides with a timing interval T2. As a result, each first duplicate data packet is used to update the channel 4 output register which is read during the next vertical interval for insertion therein. Therefore, even though the phasing of the vertical intervals of the various received television signals may be entirely random and non-synchronous, each channel output register is updated on a field by field basis without any conflict with the transfer of data from the registers to the vertical intervals of the respective television signals.

Figure 2:
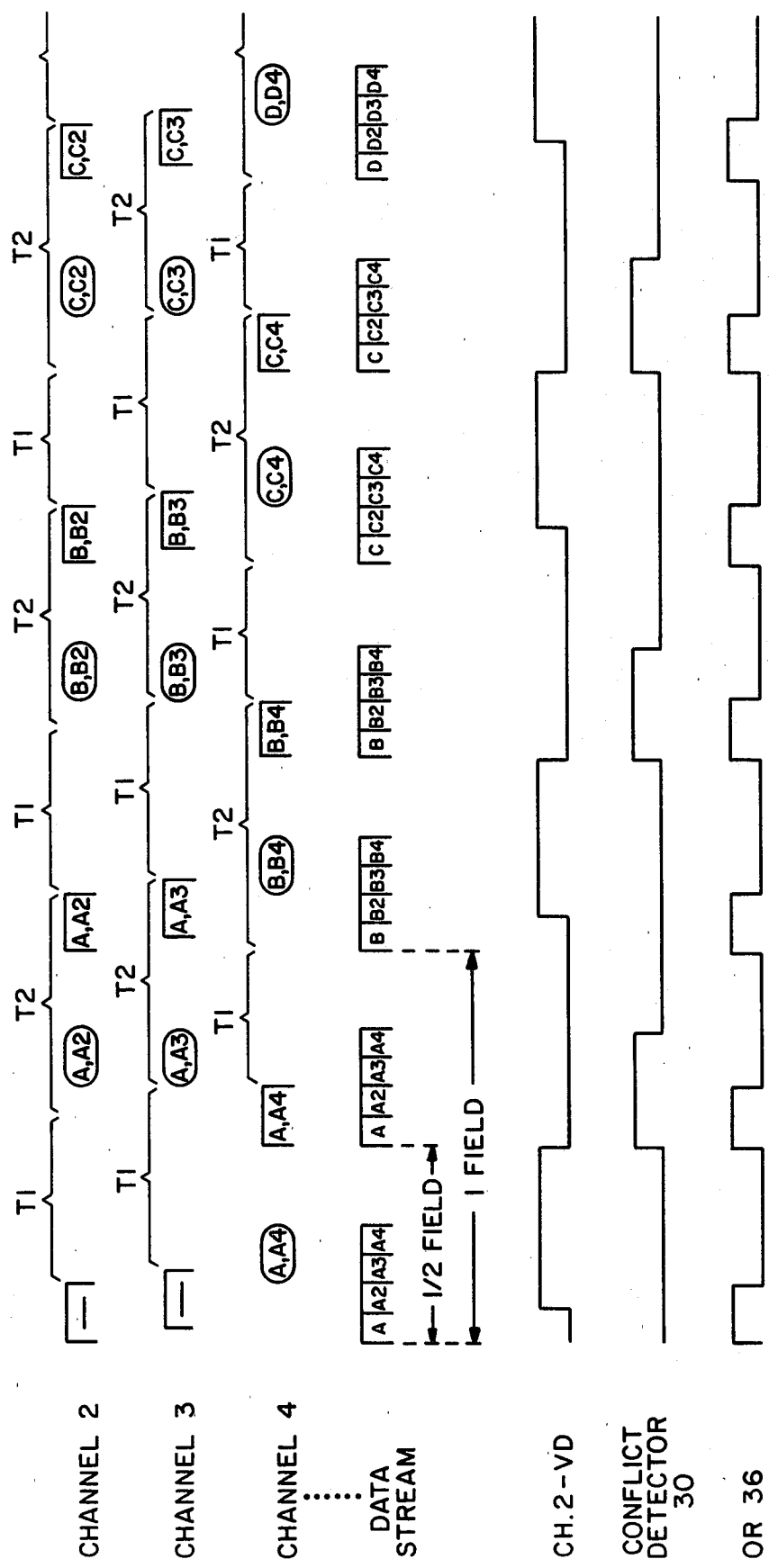
FIG. 2 is similar to FIG. 1 and further includes the condition wherein channel-dependent data packets are encoded into the vertical intervals of selected ones of the television signals.

The duplicate data packets illustrated by the data stream of FIG. 1 represents common data intended for insertion into the vertical intervals of each received television signal. As illustrated in FIG. 2, the duplicate data packets can also be formatted so as to include both common data and channel dedicated data, the common data being intended for insertion into the vertical intervals of each received television signal and the channel dedicated data being intended for insertion in the vertical intervals of the television signals received on one or more selected channels. For example, in FIG. 2, the common data of the duplicate data packets is represented by a letter, e.g. A, B, etc., whereas the channel dedicated data is represented by a letter with an associated reference numeral, e.g. A2, B3, etc., the letter representing the data and the reference numeral the selected channel.

Referring to the television signals received on channels 2 and 3, it will be seen that in each case the leading edge of each second duplicate data packet coincides with a timing interval T1 while the leading edge of each first duplicate data packet coincides with a timing interval T2 as was the case in FIG. 1. Therefore, only the second duplicate data packets are used to update the channel registers, the common data (A, B, C, D . . . ) being used to update both channel registers, the channel 2 dedicated (A2, B2, C2, D2 . . . ) being used to update only the channel 2 register and the channel 3 dedicated data (A3, B3, C3, D3 . . . ) being used to update only the channel 3 register. When the channel 2 register is read during the vertical interval of the channel 2 television signal, only the common and channel 2 dedicated data will be inserted therein while only the common and channel 3 dedicated data will be transferred from the channel 3 register into the vertical intervals of the channel 3 television signal. The channel 4 register is updated only in response to the first duplicate data packets by the common data and the channel 4 dedicated data so that only common and channel 4 dedicated data is transferred to the vertical intervals of the channel 4 television signal. As before, due to the data insertion technique of the invention, no conflict is experienced for any channel between the register updating and reading operations.

Figure 3:
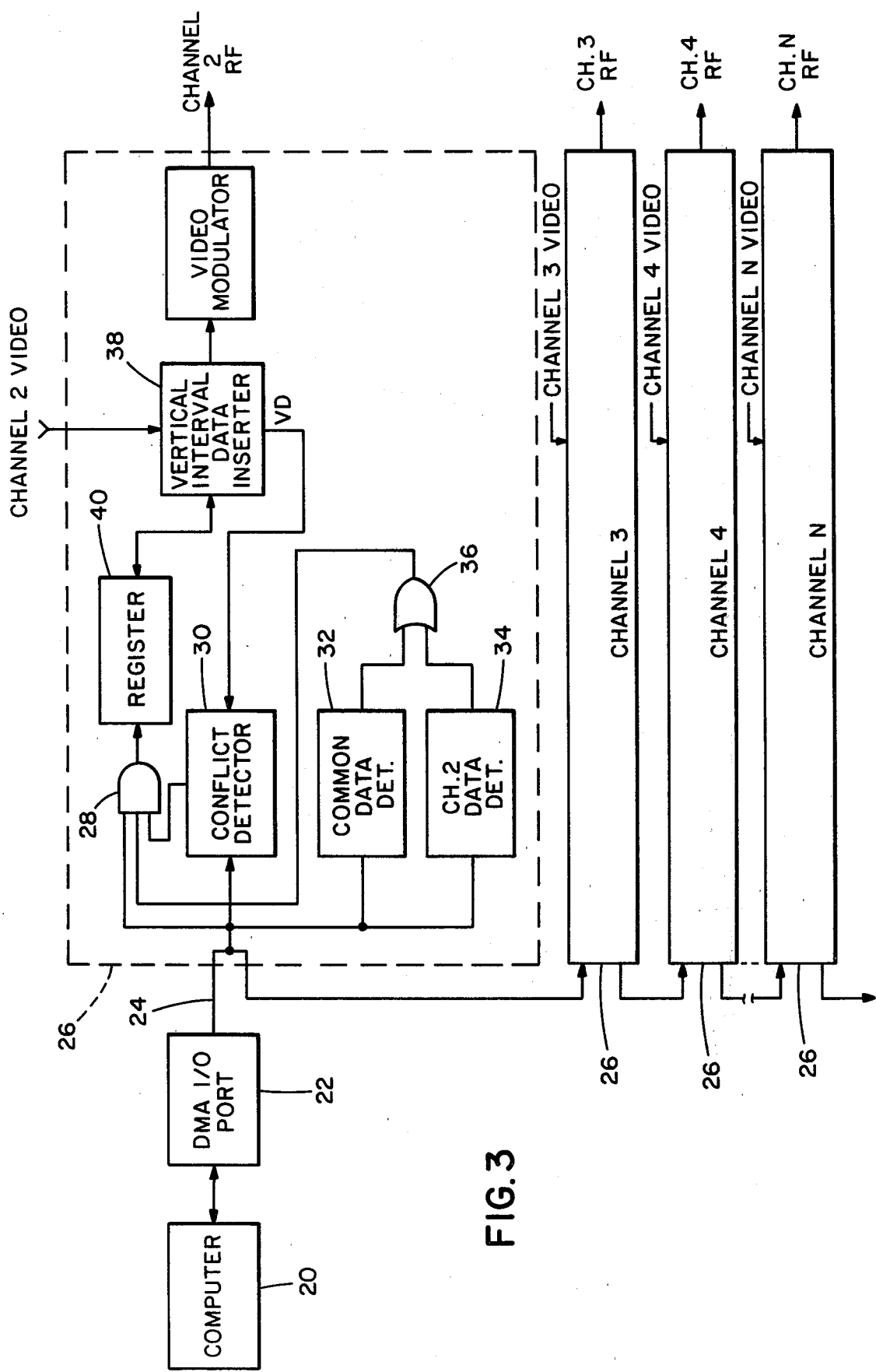
FIG. 3 is a block diagram illustrating a preferred implementation of the apparatus of the invention.

FIG. 3 illustrates a presently preferred circuit embodiment for implementing the data insertion techniques of the invention. The serial data stream comprising the duplicate data packets is generated by a single computer 20 and coupled through a direct memory access input/output port 22 to a data feed conductor 24. Each of the duplicate data packets is formatted by computer 20 such that is immediately preceded by a predetermined data start code and immediately followed by a predetermined data stop code. In addition, each common data portion of a duplicate data packet is characterized by a common data code while each channel dedicated data portion is characterized by a channel data code identifying the channel to which the data is directed.

The duplicate data packets developed on data feed conductor 24 are looped through a plurality of identically configured channel processing units 26, one such processing unit being provided for each channel through which television signals are received. Each channel processing unit 26 receives a respective baseband television signal and, in accordance with the invention, inserts data generated by computer 20 into the vertical intervals thereof. The encoded television signals are then modulated by appropriate channel RF carriers and developed as output RF television signals for transmission over the various channels. Since each channel processing unit 26 is identically configured and operates in an identical manner, the basic difference being the modulating carrier frequency, only the processing unit for channel 2, whose operation is described below, is shown in detail.

With more detail reference to FIG. 3, the duplicate data packets developed on data feed conductor 24 are coupled to the channel 2 processing unit 26 where they are supplied to one input of an AND gate 28, one input of a conflict detector 30 and to the inputs of a common data detector 32 and a channel 2 data detector 34. Common data detector 32 is adapted for detecting the common data code characterizing each common data portion of a duplicate data packet and for developing a logically high output signal in time coincidence therewith. Channel 2 data detector 34 is adapted for detecting the channel 2 data code characterizing each channel 2 dedicated data portion of a duplicate data packet and for developing a logically high output signal in time coincidence therewith. The outputs of common data detector 32 and channel 2 data detector 34 are combined in an OR gate 36 and coupled from the output thereof to a second input of AND gate 28. Therefore, the second input of AND gate 28 will be logically high during the occurrence of all common data and channel 2 dedicated data portions of a duplicate data packet.

The baseband video component of the received channel 2 television signal is coupled to an input of a vertical interval data inserter 38 of channel 2 processing unit 26. Vertical interval data inserter 38 is adapted for developing an output vertical drive (VD) signal defining the previously described first and second timing intervals. In particular, the vertical drive signal, which maybe conveniently derived by counting suitable numbers of horizontal scanning lines, goes logically high at the end of each vertical interval of the baseband video signal supplied to vertical interval data inserter 38 and remains logically high for a period of time corresponding to a first timing interval T1. Thereafter, the vertical drive signal goes logically low defining a second timing interval T2.

The vertical drive signal is coupled from vertical interval data inserter 38 to a second input of conflict detector 30 whose output is, in turn, coupled to a final input of AND gate 28. Conflict detector 30 is adapted for detecting the presence of a data start code on data feed conductor 24 and for comparing the time occurrence of the detected data start code with the state of the vertical drive signal. If the detected data start code coincides in time with a logically high state of the vertical drive signal, the output of conflict detector 30 is set to a logically high state and otherwise remains in a logically low state. Conflict detector 30 is also adapted for detecting the presence of a data stop code on data feed conductor 24 and for resetting its output to a logically low state in response thereto. Therefore, the output of conflict detector 30 will go logically high in response to a detected data start code occurring in time coincidence with a logically high state of the vertical drive signal and will remain logically high for the duration of the associated duplicate data packet.

The output of AND gate 28 is coupled to an output channel register 40 which is adapted for storing one of the duplicate data packets developed on data feed conductor 24. AND gate 28 is enabled for coupling a duplicate data packet, or a portion thereof, from data feed conductor 24 for updating or replacing the contents of register 40 whenever the outputs of conflict detector 30 and OR gate 36 are both logically high. The current contents of register 40 are read by vertical interval data inserter 38 during each successive vertical interval of the channel 2 baseband video signal for insertion therein, the encoded baseband video signal being subsequently coupled to a channel 2 video modulator 42 for developing an output channel 2 RF video signal.

With reference to FIG. 1, the channel 2 vertical drive signal is shown immediately below the data stream waveform. It will be observed that the leading edge of the second A duplicate data packet (i.e. the data start code) coincides in time with a logically high state of the vertical drive signal thereby causing the output of conflict detector 30 to go logically high. Since this duplicate data packet represents common data, the output of common data detector 32 also goes logically high causing the output of OR gate 36 to go logically high. At the end of the second A duplicate data packet both the outputs of conflict detector 30 and OR gate 36 go logically low. As a result, AND gate 28 is enabled for coupling the second A duplicate data packet for updating the contents of register 40 therewith. During the succeeding vertical interval 12 of the channel 2 baseband video signal the stored data packet is read from register 40 for insertion therein by vertical interval data inserter 38. It will be noticed that the first B duplicate data packet is developed in time overlapping relation with vertical interval 12. However, since the data start code of this duplicate data packet coincides with a logically low state of the channel 2 vertical drive signal, the output of conflict detector 30 remains logically low preventing the application of the data packet to register 40 thereby avoiding a conflict between reading and updating operations of the register. The foregoing process is repeated for subsequent duplicate data packets such that each second duplicate data packet is used to update register 40 whose contents are subsequently read during the succeeding vertical interval of the channel 2 baseband video signal. Each additional channel is processed in an analagous manner whereby conflicts between register updating and reading operations are avoided even though the phasing of the vertical intervals of the various television signals is completely non-synchronous.

The circuit of FIG. 3 operates in a substantially identical manner when the duplicate data packets include channel dedicated data (see FIG. 2). Since the output of OR gate 36 goes logically high only during common or channel 2 dedicated portions of the duplicate data packets, AND gate 28 is enabled only during these portions of a duplicate data packet. Therefore, the data coupled for updating register 40 comprises only common or channel 2 dedicated portions of a duplicate data packet. Of course, each channel processing unit 26 is adapted for detecting and processing its own respective dedicated channel data. Thus, for example, only the channel 3 processing unit 26 will accept channel 3 dedicated data, only the channel 4 processing unit 26 will accept channel 4 dedicated data, and so on.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Apparatus for encoding a plurality of data packets into the vertical intervals of a received television signal comprising:
    means for successively generating each of said data packets in the form of a pair of duplicate data packets at twice the field rate of a standard television signal;
    storage means adapted for storing one of said data packets;
    means responsive to said generating means and to said received television signal for replacing the contents of said storage means with one of the duplicate data packets of each of said pairs whose generation is non-coincident in time with the occurrence of a vertical interval of said received television signal; and
    means responsive to the occurrence of each vertical interval of said received television signal for inserting therein the current contents of said storage means.

2. Apparatus for encoding a plurality of data packets into the vertical intervals of a received television signal comprising:
    means for successively generating each of said data packets in the form of a pair of duplicate data packets whose corresponding portions are separated in time by one-half field of a standard television signal;
    storage means adapted for storing one of said duplicate data packets;
    means responsive to said generating means and to said received television signal for successively replacing the contents of said storage means with one of the duplicate data packets of each of said pairs whose generation is non-coincident in time with the occurrence of a vertical interval of said received television signal; and
    means responsive to the occurrence of each vertical interval of said received television signal for inserting therein the current contents of said storage means.

3. Apparatus according to claim 2 wherein said means for generating comprises means for generating a start code preceding each of said duplicate data packets.

4. Apparatus according to claim 3 including means responsive to said received television signal for developing a vertical drive signal, said vertical drive signal being characterized by a first logic level during the occurrence of each vertical interval of said received television signal and for a time period approximately one-half field prior thereto, said vertical drive signal otherwise being characterized by a second logic level.

5. Apparatus according to claim 4 wherein said means for replacing comprises means for replacing the contents of said storage means with each of said duplicate data packets whose associated start code occurs in time coincidence with said second logic level of said vertical drive signal.

6. Apparatus according to claim 5 wherein said means for replacing comprises means for detecting each of said duplicate data packets whose associated start code occurs in time coincidence with said second logic level of said vertical drive signal and means responsive to said detecting means for coupling each of said detected duplicate data packets for storage in said storage means.

7. Apparatus according to claim 6 including means for detecting selected portions of said duplicate data packets for enabling said coupling means for coupling only said selected portions of said duplicate data packets for storage in said storage means.

8. Apparatus for encoding a plurality of data packets into the vertical intervals of a received television signal comprising;
   means for successively generating each of said data packets in the form of a pair of duplicate data packets whose corresponding portions are separated in time by one-half field of a standard television signal, each of said duplicate data packets being preceded by a start code;
   storage means adapted for storing one of said duplicate data packets;
   means establishing a plurality of alternating first and second timing intervals dividing each field of said received television signal into first and second contiguous portions respectively, each of said first portions extending from a point approximately midway of one of said fields to the end of the preceding vertical interval and each of said second portions extending from said midway point to the end of the succeeding vertical interval;
   means for successively replacing the contents of said storage means with each of said duplicate data packets whose associated start code occurs in time coincidence with one of said first timing intervals; and
   means responsive to the occurrence of each vertical interval of said received television signal for inserting therein the current contents of said storage means.

9. Apparatus according to claim 8 wherein said means for replacing comprises means for detecting each of said duplicate data packets whose associated start code occurs in time coincidence with one of said first timing intervals and means responsive to said detecting means for coupling each of said detected duplicate data packets for storage in said storage means.

10. Apparatus according to claim 9 including means for detecting selected portions of said duplicate data packets for enabling said coupling means for coupling only said selected portions of said duplicate data packets for storage in said storage means.

11. Apparatus for encoding selected data into the vertical intervals of a plurality of received television signals comprising:
   means for successively generating a plurality of pairs of duplicate data packets, the corresponding portions of the duplicate data packets of each of said pairs being separated in time by one-half field of a standard television signal;
   a plurality of storage means each corresponding to one of said received television channels;
   means for successively replacing the contents of each of said storage means with at least part of one of said duplicate data packets of each of said pairs whose generation is non-coincident in time with the occurrence of a vertical interval of the corresponding received television signal; and
   means responsive to the occurrence of a vertical interval of each of said received television signals for inserting therein the current contents of the corresponding one of said storage means.

12. A method for encoding a plurality of data packets into the vertical intervals of a received television signal comprising:
   successively generating a plurality of pairs of duplicate data packets, the corresponding portions of the duplicate data packets of each of said pairs being separated in time by one-half field of a standard television signal;
   identifying one of the duplicate data packets of each of said pairs whose generation is non-coincident in time with the occurrence of a vertical interval of said received television signal; and
   inserting each of said identified data packets into a vertical interval of said received television signal.

13. The method of claim 12 including the steps of generating a selected start code preceding each of said duplicate data packets and dividing each field of said received television signal into a first portion extending from a point approximately midway of said field to the end of the preceding vertical interval and into a second portion extending from said midway point to the end of the succeeding vertical interval, said selecting step comprising selecting each of said duplicate data packets whose associated start code occurs in time coincidence with one of said first portions.

14. The method of claim 13 wherein said selecting step comprises selecting only predetermined portions of each of said duplicate data packets.

15. A method for encoding a plurality of data packets into the vertical intervals of a received television signal comprising:
   successively generating a plurality of pairs of duplicate data packets, the corresponding portions of the duplicate data packets of each of said pairs being separated in time by one-half field of a standard television signal;
   generating a selected start code preceding each of said duplicate data packets;
   dividing each field of said received television signal into a first portion extending from a point approximately midway of said field to the end of the preceding vertical interval and a second portion extending from said midway point to the end of the succeeding vertical interval;
   identifying one of the duplicate data packets of each of said pairs whose associated start code occurs in time coincidence with one of said first portions; and
   inserting each of said identified duplicate data packets into a vertical interval of said received television signal.

16. A method for encoding selected data into the vertical intervals of a plurality of received television signals comprising:
   successively generating a plurality of pairs of duplicate data packets, the corresponding portions of the duplicate data packets of each of said pairs being separated in time by one-half field of a standard television signal;
   identifying for each of said received television signals, one of the duplicate data packets of each of said pairs whose generation is non-coincident in time with the occurrence of a vertical interval of the respective received television signal; and
   inserting each of the identified duplicate data packets into a vertical interval of the respective received television signal.

* * * * *